Figure 1:
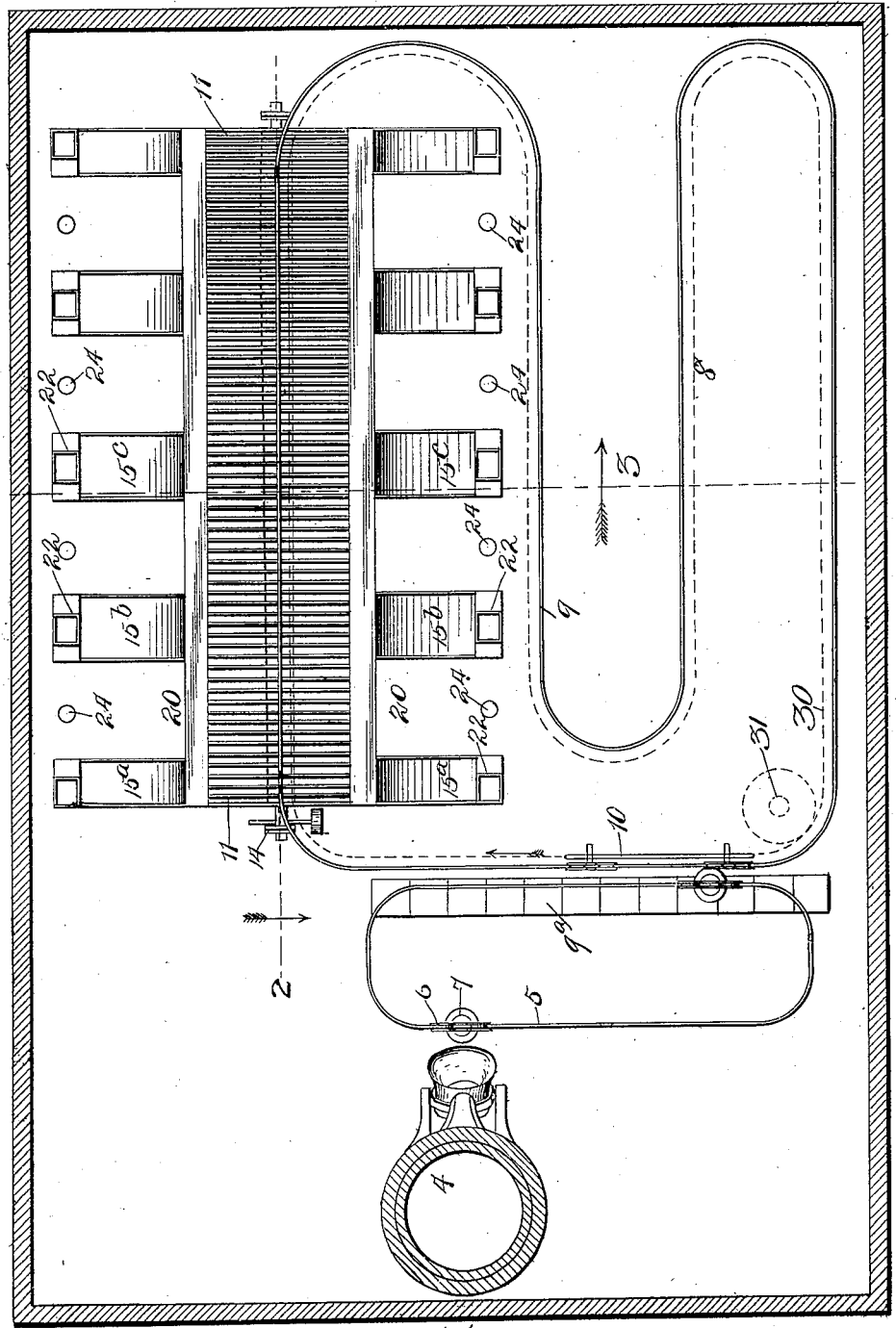

No. 660,369. Patented Oct. 23, 1900.
W. W. DOOLITTLE.
APPARATUS FOR MAKING CASTINGS.
(Application filed Oct. 9, 1899.)

(No Model.) 3 Sheets—Sheet 1.

Witnesses
Ira D. Perry
J B Weir

Inventor
William W. Doolittle
by
Paul Synnestvedt Atty.

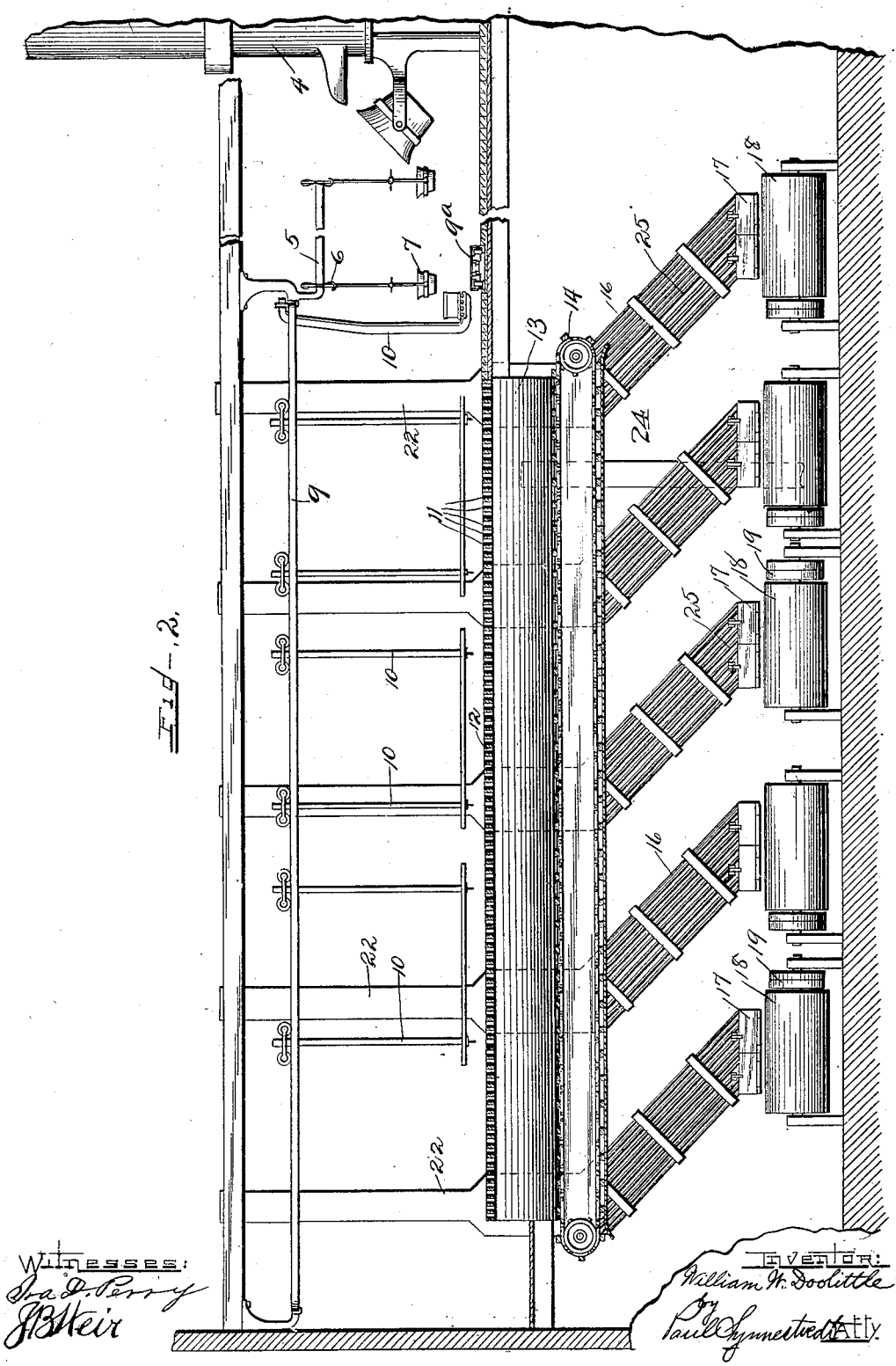

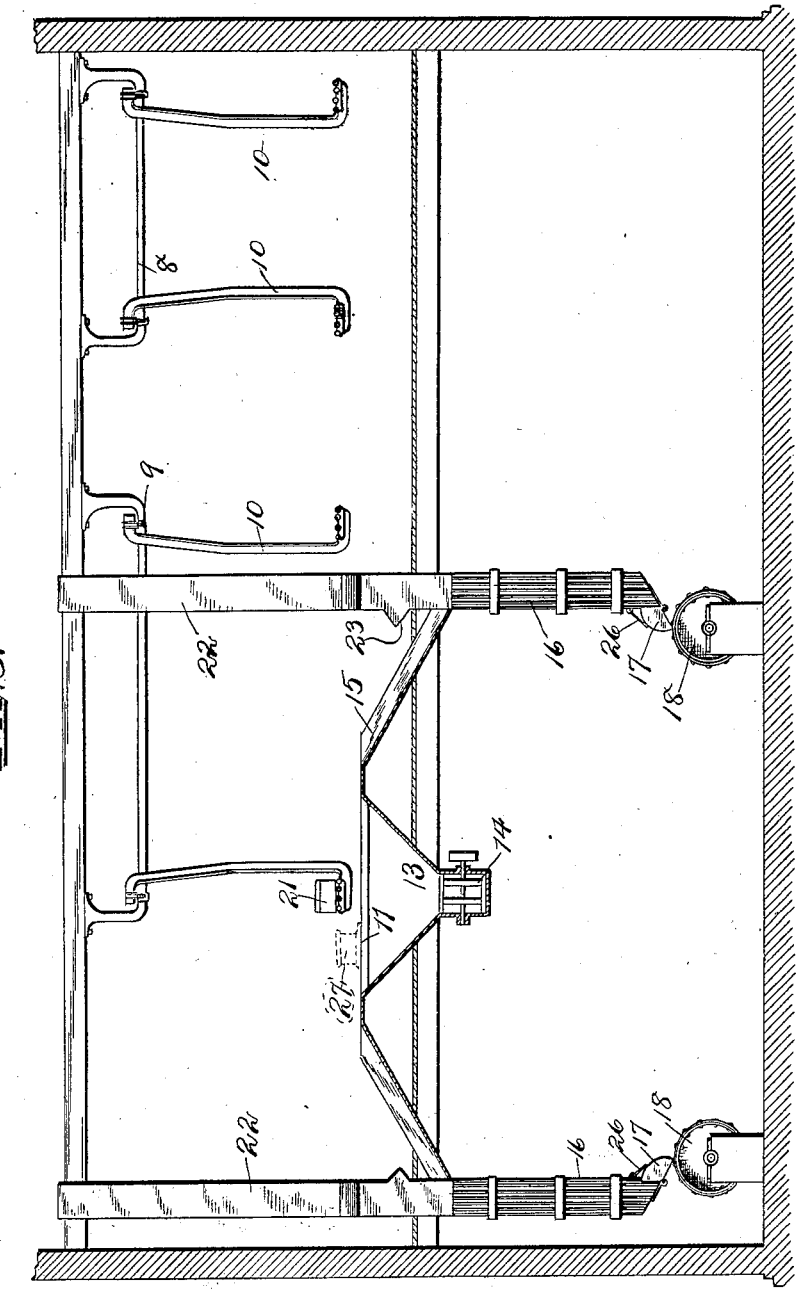

UNITED STATES PATENT OFFICE.

WILLIAM W. DOOLITTLE, OF CHICAGO, ILLINOIS, ASSIGNOR TO THE CRANE COMPANY, OF SAME PLACE.

APPARATUS FOR MAKING CASTINGS.

SPECIFICATION forming part of Letters Patent No. 660,369, dated October 23, 1900.

Application filed October 9, 1899. Serial No. 733,014. (No model.)

*To all whom it may concern:*

Be it known that I, WILLIAM W. DOOLITTLE, a citizen of the United States, and a resident of Chicago, county of Cook, and State of Illinois, have invented certain new and useful Improvements in Apparatus for Making Castings, of which the following, taken in connection with the accompanying drawings, is a specification.

My invention is in the nature of an improvement upon the invention set forth in a prior patent issued to me July 11, 1893, No. 501,331. In the said patent I have shown an endless track passing near the cupola, said track being provided with one or more pouring-ladles supported thereon by carriers, a second endless track passing through the molding-space and extending for a portion of its length parallel to and in close proximity to the ladle-track, carriers on said second track adapted to receive molds, and means for moving the mold-carriers along the track. I have also shown in the said patent an endless moving platform located subjacent to and parallel with said mold-carrier track and moving in unison with the mold-carriers, together with means for moving said platform. In the apparatus of the patent referred to I have also shown an elevator adapted to receive the filled molds from the mold-carriers after pouring and a screen upon which the molds are transferred from the elevator, whereby the sand and the castings may be separated and the castings discharged in one direction and the sand carried off in another and by suitable conveyers taken back to the mold-room. In connection with the said elevator I have, in the prior patent referred to, employed a transferring device for lifting the molds from the carriers and delivering them to the elevator. The lifting device referred to, as well as the elevator itself, I now propose to do away with by means of the improvements herein set forth. Such parts, besides adding complication and expense to the apparatus as a whole, require extra labor in their operation.

In my present invention I employ a mold-carrier, means for moving the same, a ladle-carrier, tracks for said mold-carrier and for said ladle-carrier, and a pouring-platform, and means for moving said pouring-platform, all substantially similar to those of my prior invention; but instead of employing the elevator and lifting device and the coöperating parts for taking the molds from the mold-carriers and separating the sand and castings I provide beneath a portion of the mold-carrier track itself, or adjacent thereto, or on a plane lower than the plane along which the molds are carried, a screen or grating, beneath which is arranged a sand-conveyer and adjacent to which are arranged chutes into which the castings are delivered after they are separated from the sand. The screen may, if preferred, be arranged so it can be agitated.

A further object of my invention is the provision of a novel arrangement of the said screen and of the said chutes and also an addition to the latter of ventilating flues for the purpose of carrying off the heat, odors, and smoke.

The above, as well as such other objects as may hereinafter appear, I attain by means of a construction which I have illustrated in preferred form in the accompanying drawings, in which—

Figure 1 is a plan view of an apparatus for making castings constructed in accordance with my present invention. Fig. 2 is a side elevation thereof, partly in section; and Fig. 3 is an end elevation, also partly in section.

Adjacent to the cupola 4 I arrange an endless track 5, upon which are suspended by suitable carriers 6 a plurality of pouring-ladles 7. Extending through the molding-room 8 I arrange an endless track 9, which for a portion of its length is parallel with and adjacent to the ladle-carrying track 5. Subjacent to the ladle-carrying track at the place or portion where it is parallel with the track 9 I arrange a pouring-platform $9^a$, the latter being provided with suitable means for causing it to move. Upon the track 9 are a number of mold-carriers 10 of the general construction clearly indicated in Figs. 2 and 3, said mold-carriers being provided with means for causing them to move similar to the means already described in my patent heretofore referred to, which means I have illustrated diagrammatically in Fig. 1, in which the chain or other flexible connection 30 is shown as attached to the mold-carrier 10 and constructed to be driven by the driving-pulley or other equivalent mechanism 31.

At a suitable place I provide a screen or grating 11, arranged in position so that the mold-carriers 10 will pass over it, as shown, (or adjacent to it on either side, the screen in such case being preferably arranged on a plane below the plane along which the molds are carried,) through that portion of their travel immediately following the passage adjacent to the pouring-platform, the direction of movement being shown by the arrow in Fig. 1. The screen 11 is preferably composed of a large number of parallel bars 12, arranged as shown in Figs. 1 and 2, having beneath them a kind of hopper-trough 13, along the bottom of which is the sand-carrier 14. At the sides of the screen 11 are arranged casting-chutes 15, leading into the cages or lattice-work boxes 16, the lower ends of which are provided with gates 17, adapted when open to discharge the castings into the rattlers 18, which may be driven in any suitable manner, the means shown being the pulleys 19. The chutes 15 are arranged so that there will be floor-space 20 between each two adjacent chutes in which a man or attendant can stand with some implement, such as a rake, with which to roll the molds 21 off the mold-carriers onto the screen and separate the castings from the same, raking or pushing the castings into the proper chutes. The upper ends of the cages 16 are provided with ventilating-flues 22, having openings not only from the cages 16, but also at 23 from above the chutes 15, so that they will be efficient to carry off the greater portion of the heat, gases, and smoke. At intervals along the floor I arrange a series of similar chutes 24, into which are to be thrown the sprues and gates when they are taken off from the castings.

Referring now particularly to Fig. 2, it will be seen that the cages 16 are arranged in an inclined position and preferably made double—that is, having a dividing wall or partition 25 extending up to the beginning of the vertical flue and each half being separately provided with a door or gate 17—so that one-half the castings in each cage may be emptied into the tumbler 18 without the other half, if preferred. The gates 17 are made, as shown in Fig. 3, to form a spout when open and provided with suitable locking devices 26. The main purpose of the inclined cages is to break the fall of the castings, which while they are hot are the more liable to be damaged by violent blows or striking against each other.

The operation of my invention is as follows: The molds 21, having been formed in the molding-room, are placed upon the mold-carriers 10, and said carriers being constantly moving are taken around in the direction shown by the arrow in Fig. 1 and poured while passing the pouring-platform 9ª. After leaving the pouring-platform they travel around along the track 9 over the grating or screen 11. When the molds are made, they are preferably marked in some convenient manner with a number or other character indicating the nature of the contents. The casting-chutes 15 are correspondingly numbered—as, for example, the first one might be 15ª, the second 15ᵇ, the third 15ᶜ, and so on, when 15ª would naturally be designed to receive the smaller castings, as they would cool and solidify more rapidly than the larger ones. The attendant, therefore, standing in a position at 20, when the mold came around in front of him marked 15ª would roll it off onto the screen 11, upon which it would naturally fall in inverted position, as shown at 27 in Fig. 3. The sand and the castings being then raked along until the sand fell through the screen 11, the castings having the sprues knocked off from them would be raked into the chute 15ª, the sprues or gates being pushed down the chute or opening 24. When a roll came around marked 15ᶜ, it would not be dumped onto the screen 11 until it came opposite the chute having the corresponding mark, which would be about the middle of the length of the screen or grating. These castings would naturally be the larger ones, as they would have more time to cool. The heaviest castings would not be raked off until they had been carried to the rear end of the sand-grating, and this would give them ample time to cool before the mold was broken up.

While I have shown and described the particular form in which I prefer to apply my invention, it is obvious that as to many of the details it could be altered considerably from what I have shown without departing materially from the spirit of my invention, and all such immaterial modifications I desire to be understood as included within the scope of my claims.

Having thus described my invention, what I claim as new, and desire to secure by Letters Patent, is—

1. An apparatus for manufacturing castings comprising an endless mold-carrier track, mold-carriers thereon, means for moving said mold-carriers, an elongated screen arranged adjacent to said mold-carrier track for a portion of its length, adapted to receive the molds directly from the mold-carriers, and a series of sorting-chutes arranged adjacent to the screen.

2. An apparatus for manufacturing castings comprising an endless mold-carrier track, mold-carriers thereon means for moving said mold-carriers, a screen arranged adjacent to said mold-carrier track for a portion of its length, adapted to receive the molds directly from the mold-carriers, and means for sorting the castings arranged adjacent to the screen.

3. An apparatus for manufacturing castings comprising an endless mold-carrier track, mold-carriers thereon, means for moving the said mold-carriers, a screen arranged beneath said mold-carrier track for a portion of its length adapted to receive the molds directly from the mold-carriers and separate the castings and sand, a chute at the side of said screen to receive the castings, a sand-conveyer beneath said screen to receive the sand, and a cage for receiving and cooling the castings, constructed to permit the free circulation of air therethrough, substantially as described.

4. An apparatus for manufacturing castings comprising an endless mold-carrier track, mold-carriers thereon, means for moving the said mold-carriers, a screen arranged beneath said mold-carrier track for a portion of its length adapted to receive the molds directly from the mold-carriers and separate the castings and sand, a chute at the side of said screen to receive the castings, a sand-conveyer beneath said screen to receive the sand, and a cage for receiving and cooling the castings, said cage being provided with a ventilating-flue, substantially as described.

5. An apparatus for manufacturing castings comprising an endless mold-carrier track, mold-carriers thereon, means for moving the said mold-carriers, a screen arranged beneath said mold-carrier track for a portion of its length adapted to receive the molds directly from the mold-carriers and separate the castings and sand, a chute at the side of said screen to receive the castings, a sand-conveyer beneath said screen to receive the sand, and a cage for receiving and cooling the castings, said cage arranged in inclined position whereby the force of the fall of the castings is broken, substantially as described.

WILLIAM W. DOOLITTLE.

Witnesses:
PAUL CARPENTER,
PAUL SYNNESTVEDT.